H. G. ALTVATER.
VARIABLE SPEED TRANSMISSION MECHANISM.
APPLICATION FILED OCT. 29, 1918.

1,337,578. Patented Apr. 20, 1920.
3 SHEETS—SHEET 2.

WITNESSES
Edw. Thorpe

INVENTOR
H. G. Altvater
BY
ATTORNEYS

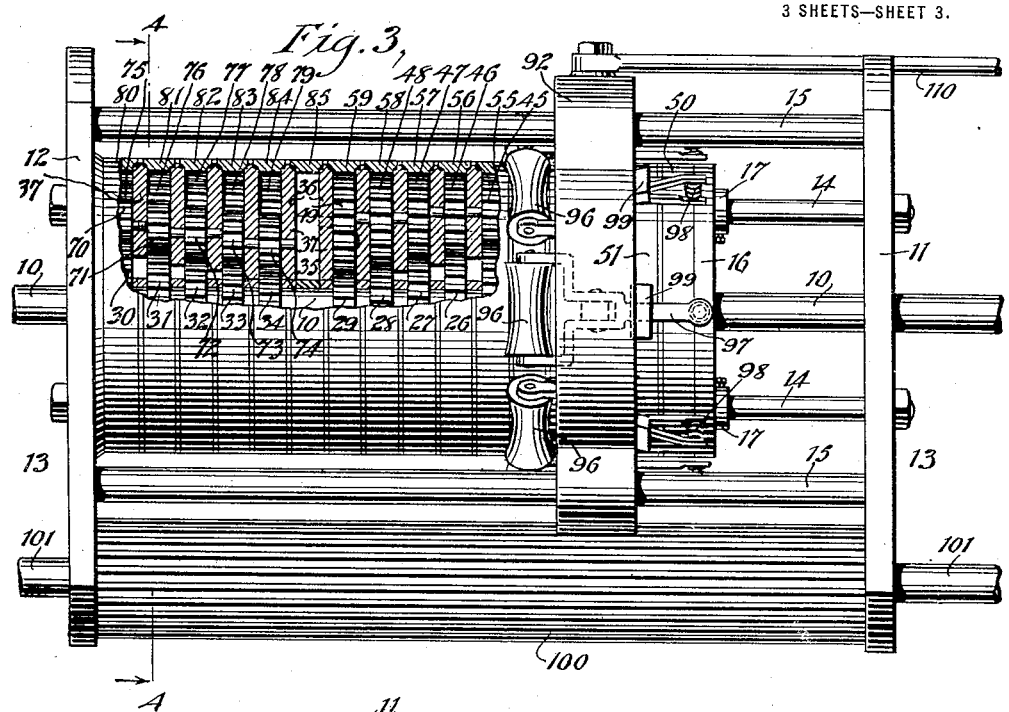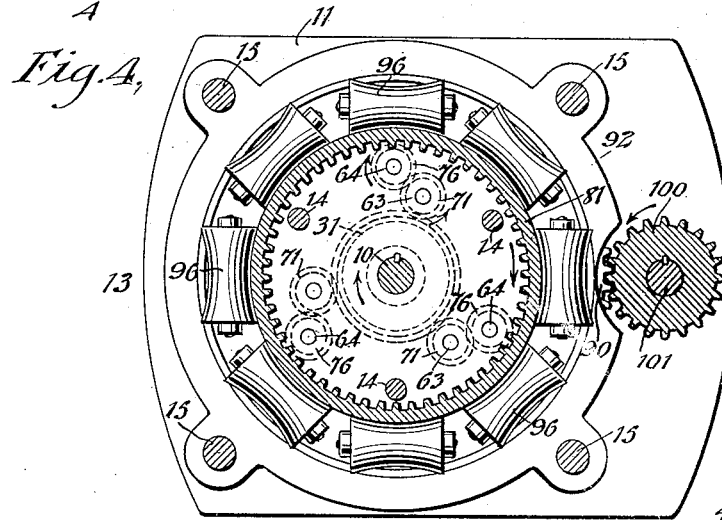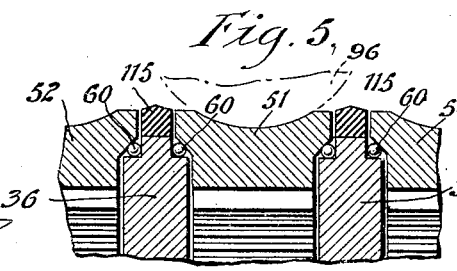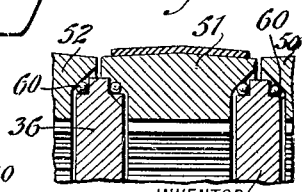

UNITED STATES PATENT OFFICE.

HERBERT G. ALTVATER, OF DENVER, COLORADO.

VARIABLE-SPEED-TRANSMISSION MECHANISM.

1,337,578. Specification of Letters Patent. Patented Apr. 20, 1920.

Application filed October 29, 1918. Serial No. 260,206.

*To all whom it may concern:*

Be it known that I, HERBERT G. ALTVATER, a citizen of the United States, and a resident of Denver, in the county of Denver and State of Colorado, have invented a new and Improved Variable - Speed - Transmission Mechanism, of which the following is a full, clear, and exact description.

The object of the invention is to provide a new and improved variable speed transmission mechanism arranged to permit the operator to quickly and easily change from one speed to another without danger of stripping gear wheels or otherwise injuring the transmission mechanism. Another object is to provide a large number of different speeds thus permitting a gradual instead of an abrupt change from high speed to low speed or vice versa thereby rendering it possible for the engine to maintain a constant speed. Another object is to provide a reversing mechanism having a similar large number of graded gear mechanisms. Another object is to provide a transmission mechanism of simple and durable construction and one that is not liable to get easily out of order.

With these and other objects in view the invention consists of certain novel features of construction as hereinafter shown and described and then specifically pointed out in the claims.

A practical embodiment of the invention is represented in the accompanying drawings forming a part of this specification, in which similar characters of reference indicate corresponding parts in all the views.

Fig. 3 is a reduced plan view of the variable speed transmission mechanism;

Fig. 4 is a transverse section of the same on the line 4—4 of Fig. 3;

Fig. 5 is an enlarged sectional side elevation of a modified form of part of the variable speed transmission mechanism; and Fig. 6 is a similar view of another modified form of part of the variable speed transmission mechanism.

Figure 2:
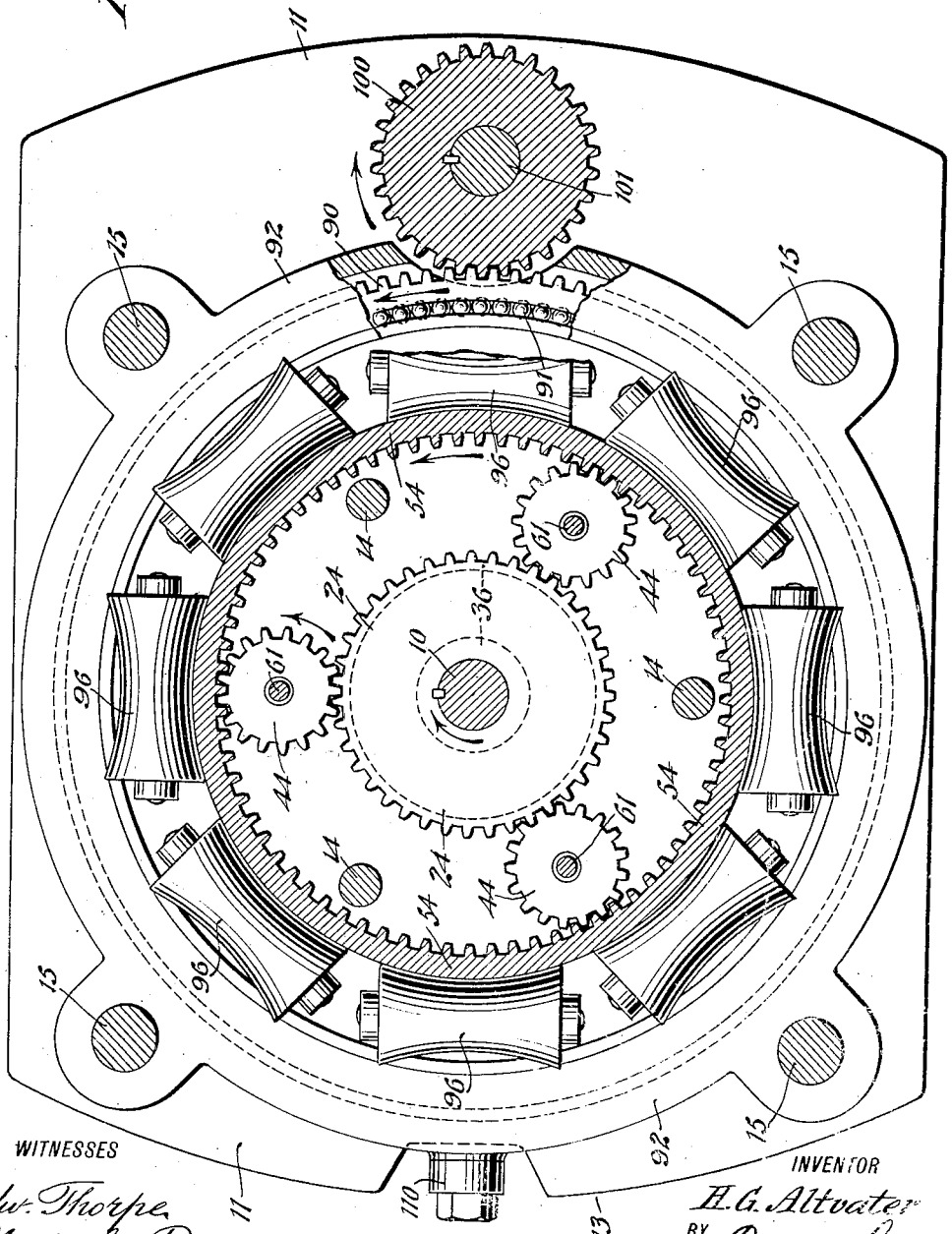
Fig. 2 is a transverse section of the same on the line 2—2 of Fig. 1 and with parts broken out.

The driving shaft 10 driven from a motor or other power is journaled in the heads 11 and 12 of a main frame 13 having two sets of rods 14 and 15 connecting the heads 11 and 12 with each other. The rods 14 also support a head 16 resting against collars 17 formed on the said rods 14. On the shaft 10 adjacent the head 16 are keyed or otherwise secured a series of step gear wheels 20, 21, 22, 23, 24, 25, 26, 27, 28 and 29, and another set of step gear wheels 30, 31, 32, 33 and 34 are keyed or otherwise secured on the shaft 10 adjacent the head 12, and the two small gear wheels 29 and 34 are spaced from each other by a collar 35, as plainly indicated in Fig. 3. The step gear wheels 20 to 29 and the step gear wheels 30 to 34 are spaced apart by spacing and supporting members 36 and 37, respectively, held on the rods 14, and the several step gear wheels 20 to 29 are connected by pinions 40, 41, 42, 43, 44, 45, 46, 47, 48 and 49 with internal gear wheels 50, 51, 52, 53, 54, 55, 56, 57, 58 and 59 mounted to rotate on ball bearings 60 arranged on the peripheral edges of the spacing and supporting members 36. The several connecting gear wheels 40 to 49 are provided with journals 61 mounted to turn in the corresponding spacing and supporting members 36. The step gear wheels 30 to 34 are in mesh with pinions 70, 71, 72, 73, 74 in mesh with pinions 75, 76, 77, 78 and 79 in mesh with internal gear wheels 80, 81, 82, 83, and 84 mounted to rotate on ball bearings 62 formed on the outer edges of the spacing and supporting members 37. An inactive wheel 85 is interposed between the internal gear wheels 59 and 84 and this wheel 85 is located opposite the spacing collar 35. It will be noticed that the several internal gear wheels 50 to 59, 80 to 84 and the neutral wheel 85 are of the same diameters and are arranged one alongside the other. The several pinions 70 to 79 are provided with journals 63, 64 mounted to turn in the spacing and supporting members 37. When the drive shaft 10 is rotated say in a transverse direction then the step gear wheels 20 to 29 rotate with it and their motion is transmitted by the pinions 40 to 49 to the internal gear wheels 50 to 59 to rotate the latter in a reverse direction, as indicated in Fig. 2. At the same time the step gear wheels 30 to 34 rotate with the drive shaft 10 and by the pairs of pinions 70 to 79 a rotary motion is given to the internal gear wheels 80 to 84 in a clockwise direction, as will be readily understood by reference to Fig. 4. The rotary motion of the internal gear wheels 50 to 59 and 80 to 84 may be transmitted to other machinery by various means, such, for instance, as a belt passing around the peripheral faces of the internal gear wheels and adapted to be shifted from one to the other by a suitable shifting mechanism (see Fig. 6).

Figure 1:
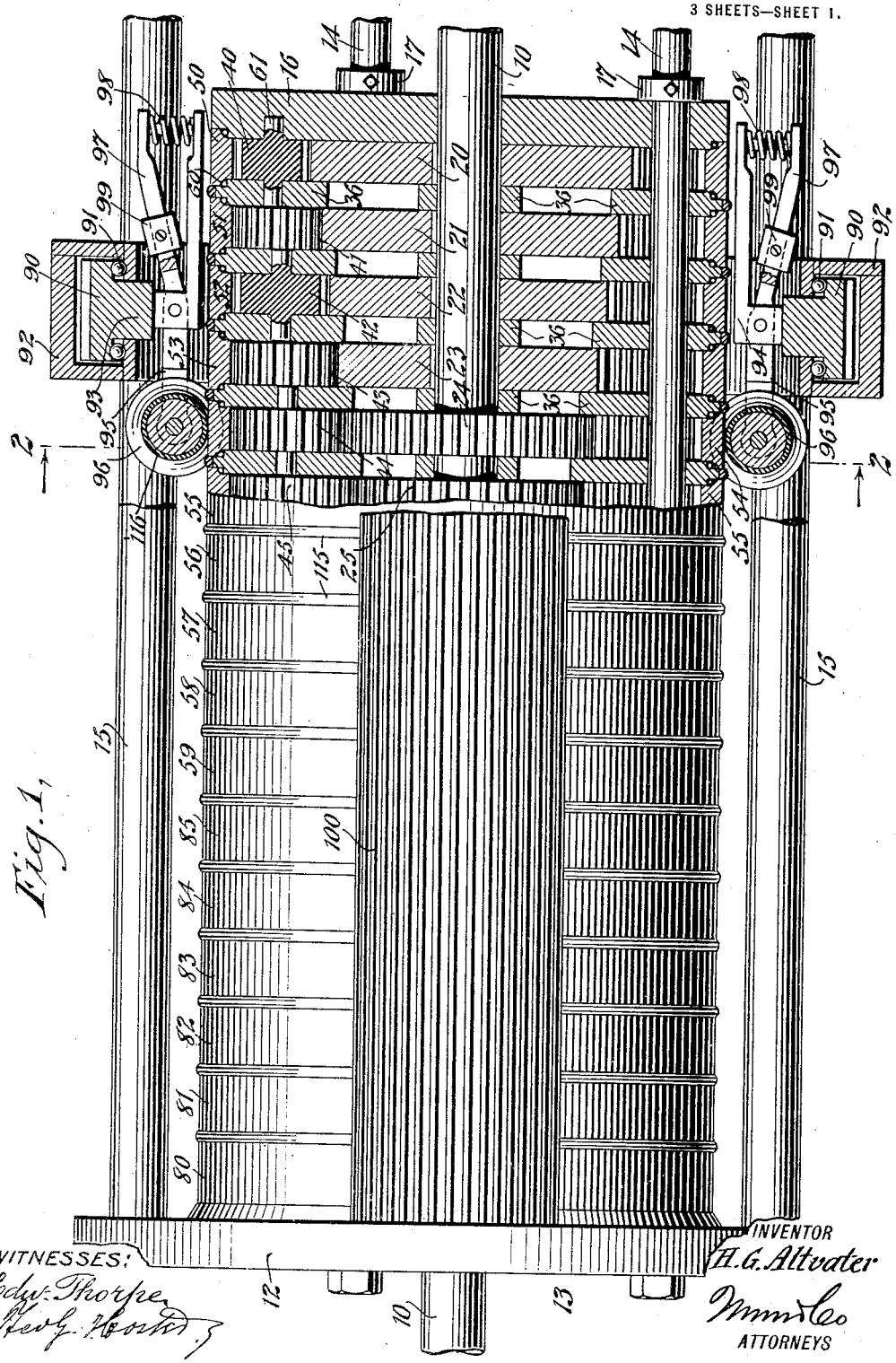
Figure 1 is a side elevation of the variable speed transmission mechanism with parts shown in section.

As shown in Figs. 1, 2 and 3, the rotary motion of any one of the internal gear wheels 50 to 59 and 80 to 85 is transmitted to a ring-shaped gear wheel 90 mounted to turn on roller bearings 91 within a gear casing 92 mounted to slide on the rods 15 which are guide rods for the said casing. The gear wheel 90 is provided with an inwardly extending annular flange 93 on which are secured arms 94 spaced equal distances apart. On each of the arms 94 is fulcrumed a lever 95 on one end of which is journaled a roller 96 adapted to be moved in contact with the peripheral face of any one of the internal gear wheels 50 to 59 and 80 to 84. The lever 95 is provided with an extension 97 pressed on by a spring 98 resting on the arms 94 to hold the roller 96 in firm frictional contact with the peripheral face of the corresponding internal gear wheels 50 to 59 and 80 to 84. A counterweight 99 is mounted on the extension 97 of the lever 95 to counterbalance the roller 96. It will be noticed that each roller 96 forms a clutch member for connecting a corresponding internal gear wheel with the gear wheel 90 to rotate the latter from such internal gear wheel at the speed thereof, and this gear wheel 90 is in mesh at all times with a pinion 100 extending between the heads 11 and 12 and secured on a shaft 101 to be driven and journaled in the heads 11 and 12. The rotary motion of the shaft 101 is transmitted to other machinery in the usual way.

The gear casing 92 is shifted on the guide rods 15 by a suitable shifting mechanism 110 under the control of an operator and of usual construction so that further description of the same is not deemed necessary. It is understood that by moving the gear casing 92 along the guide rods 15 the clutch rollers 96 can be moved in engagement with any one of the internal gear wheels 50 to 59 and 80 to 85 to rotate the gear wheel 90 in either a forward or a reverse direction, and at a varying speed. Thus if the clutch rollers 96 are in engagement with the peripheral face of the internal gear wheel 50 then the gear wheel 90 is rotated at a high rate of speed in an anti-clockwise direction and consequently the pinion 100 is rotated at a high rate of speed in a clockwise direction. When the clutch roller 96 is in engagement with the internal gear wheel 59 then the latter is rotated at a low rate of speed from the drive shaft 10 and consequently rotates the pinion 100 in a clockwise direction at a low rate of speed. When the clutch roller 96 is in engagement with the internal gear wheel 80 rotated at a high rate of speed from the shaft 10 but in a clockwise direction then a similar rotary motion is given to the gear wheel 90 whereby the pinion 100 is rotated at a high speed in an anti-clockwise direction. When the clutch roller 96 is in engagement with the internal gear wheel 84 driven at a low rate of speed from the shaft 10 in a clockwise direction then the gear wheel 90 is similarly rotated and a rotary motion is given to the pinion 100 at a low rate of speed in an anti-clockwise direction. In order to prevent the clutch roller 96 from simultaneously engaging two adjacent internal gear wheels use is made of spacing washers 115 mounted on or forming part of the spacing and supporting members 36 and 37 and projecting slightly beyond the peripheral faces of the internal gear wheels 50 to 59, 80 to 84 and the neutral gear wheel 85.

The peripheral faces of the internal gear wheels 50 to 59, 80 to 84 may be roughened to insure a firm contact with the clutch roller 96 and the latter is preferably provided with a covering 116 of rubber or other suitable material. If desired, the peripheral face of each of the internal gear wheels may be concave, as shown in Fig. 5, to obtain a better grading surface with the roller 96.

From the foregoing it will be seen that by the arrangement described the operator can readily and quickly change from one speed without danger of stripping gear wheels as is the case in speed transmission mechanisms as heretofore constructed.

It will also be noticed that a large number of different speeds, say 10 for forward drive and 5 for reverse drive, can be obtained without making an abrupt change from high speed to low speed or vice versa thereby rendering it possible for the motor connected with the shaft 10 to rotate at a practically constant speed.

It will also be noticed that the variable speed transmission mechanism takes up very little room and is exceedingly simple and durable in construction and not liable to get easily out of order.

It will further be noticed that by the use of this variable speed transmission mechanism the speed can be changed directly by shifting the gear casing 92 once and in one direction only, while by the use of transmission mechanisms as now generally used three operations are required, namely, to release the clutch, to change the speed by interlocking moving parts and to tighten the clutch, the second operation mentioned being very uncertain, difficult and dangerous.

Although I have shown and described two forms of transmitting the rotary motion of the driven internal gear wheels to other machinery, it is evident that I do not limit myself to the precise construction and arrangement of parts as set forth and shown, as the same may be varied without deviating from the spirit of my invention.

The axis of the driving shaft and step gear wheels need not necessarily coincide with the axis of the internal gear wheels as the connecting pinions or gear wheels between the step gear wheels and the internal gear wheels may be eliminated by having the two axes parallel or by using bevel gears and having the two axes cross.

Having thus described my invention, I claim as new and desire to secure by Letters Patent:—

1. In a variable speed transmission mechanism, a drive shaft, a plurality of wheels arranged one alongside the other and having a common axis coinciding with that of the said drive shaft, the wheels being of the same diameter to form approximately cylindrical structures, independent means connecting the said shaft with each of the wheels to rotate the wheels simultaneously at different speeds, and power transmitting means adapted to engage the peripheral face of any one of the said wheels to drive the said power transmitting means.

2. In a variable speed transmission mechanism, a drive shaft, a plurality of wheels arranged one alongside the other and having a common axis coinciding with that of the said drive shaft, the wheels being of the same diameter to form an approximately cylindrical structure, independent means connecting the said shaft with the wheels to rotate sundry of the said wheels in one direction at different speeds and to rotate the remaining wheels in a reverse direction at different speeds, and power transmitting means adapted to engage the peripheral face of any one of the said wheels to drive the said power transmitting means at correspondingly varying speeds and in a forward or reverse direction.

3. A variable speed transmission mechanism, comprising a drive shaft, a series of step gear wheels secured to the said drive shaft, a series of internal gear wheels arranged one alongside the other and of the same external diameter, the said internal gear wheels being concentric with the said step gear wheels, connecting gear wheels connecting the said step gear wheels with the said internal gear wheels, and power transmitting means adapted to connect externally with any one of the said internal gear wheels.

4. A variable speed transmission mechanism, comprising a drive shaft, a series of step gear wheels secured to the said drive shaft, a series of internal gear wheels arranged one alongside the other and of the same external diameter, the said internal gear wheels being concentric with the said step gear wheels, connecting gear wheels connecting the said step gear wheels with the said internal gear wheels, a frame having heads adjacent the outermost step gear wheels, the frame having rods connecting the heads with each other, supporting rings mounted on the said rods and interposed between adjacent step gear wheels, the said rings supporting the said connecting gear wheels and the said internal gear wheels, and power transmitting means adapted to connect exteriorly with any one of the said internal gear wheels.

5. A variable speed transmission mechanism, comprising a drive shaft, a series of step gear wheels secured to the said drive shaft, a series of internal gear wheels arranged one alongside the other and of the same external diameter, the said internal gear wheels being concentric with the said step gear wheels, connecting gear wheels connecting the said step gear wheels with the said internal gear wheels, an annular slidable gear case concentric with the said internal gear wheels, a gear wheel journaled in the said gear case, clutch members mounted on the said gear wheel in the gear case and adapted to engage the peripheral face of any one of the said internal gear wheels to transmit the rotary motion of such internal gear wheel to the said gear wheel in the gear casing, and a driven shaft carrying a pinion in mesh at all times with the said gear casing gear wheel.

6. A variable speed transmission mechanism, comprising a drive shaft, a series of step gear wheels secured to the said drive shaft, a series of internal gear wheels arranged one alongside the other and of the same external diameter, the said internal gear wheels being concentric with the said step gear wheels, connecting gear wheels connecting the said step gear wheels with the said internal gear wheels, an annular slidable gear case concentric with the said internal gear wheels, a gear wheel journaled in the said gear case, clutch members mounted on the said gear wheel in the gear case and adapted to engage the peripheral face of any one of the said internal gear wheels to transmit the rotary motion of such internal gear wheel to the said gear wheel in the gear casing, a driven shaft carrying a pinion in mesh at all times with the said gear casing gear wheel, and means for shifting the said gear casing.

7. A variable speed transmission mechanism, comprising a drive shaft, a series of step gear wheels secured to the said drive shaft; a series of internal gear wheels arranged one alongside the other and of the same external diameter, the said internal gear wheels being concentric with the said step gear wheels, connecting gear wheels connecting the said step gear wheels with the said internal gear wheels, an annular slidable gear case concentric with the said internal gear wheels, a gear wheel journaled in the said gear case, clutch members mounted on the said gear wheel in the gear case and adapted to engage the peripheral face of any one of the said internal gear wheels to transmit the rotary motion of such internal gear wheel to the said gear wheel in the gear casing, a driven shaft carrying a pinion in mesh at all times with the said gear casing wheel, means for shifting the said gear casing, a frame having heads and rods connecting the heads with each other, the rods extending through the said internal gear wheels and outside the said step gear wheels, and spacing and supporting members mounted on the said rods and interposed between adjacent step gear wheels, the said spacing and supporting members carrying the said connecting gear wheels and having bearings at their outer edges for the said internal gear wheels to turn on.

8. A variable speed transmission mechanism, comprising a drive shaft, a series of step gear wheels secured to the said drive shaft, a series of internal gear wheels arranged one alongside the other and of the same external diameter, the said internal gear wheels being concentric with the said step gear wheels, connecting gear wheels connecting the said step gear wheels with the said internal gear wheels, an annular slidable gear case concentric with the said internal gear wheels, a gear wheel journaled in the said gear case, clutch members mounted on the said gear wheel in the gear case and adapted to engage the peripheral face of any one of the said internal gear wheels to transmit the rotary motion of such internal gear wheel to the said gear wheel in the gear casing, a driven shaft carrying a pinion in mesh at all times with the said gear casing gear wheel, means for shifting the said gear casing, a frame having heads and rods connecting the heads with each other, the rods extending through the said internal gear wheels and outside the said step gear wheels, spacing and supporting members mounted on the said rods and interposed between adjacent step gear wheels, the said spacing and supporting members carrying the said connecting gear wheels and having bearings at their outer edges for the said internal gear wheels to turn on, and guide rods held on the heads of the said frame exterior of the said internal gear wheels and on which guide rods the said gear casing is mounted to slide.

9. A variable speed transmission mechanism comprising a drive shaft, a series of step gear wheels secured to the said drive shaft, a series of internal gear wheels arranged one alongside the other and of the same external diameter, the said internal gear wheels being concentric with the said step gear wheels, connecting gear wheels connecting the said step gear wheels with the said internal gear wheels, an annular slidable gear case concentric with the said internal gear wheels, a gear wheel journaled in the said gear case and provided with fixed arms, levers fulcrumed on the said arms, friction rollers journaled on the said levers and adapted to engage externally any one of the said internal gear wheels and a shaft to be driven, a pinion on the said shaft to be driven and in mesh at all times with the said gear wheel in the gear casing, and means for shifting the latter.

10. A variable speed transmission mechanism, comprising a drive shaft, a series of step gear wheels secured to the said drive shaft, a series of internal gear wheels arranged one alongside the other and of the same external diameter, the said internal gear wheels being concentric with the said step gear wheels, connecting gear wheels connecting the said step gear wheels with the said internal gear wheels, an annular slidable gear case concentric with the said internal gear wheels, a gear wheel journaled in the said gear case and provided with fixed arms, levers fulcrumed on the said arms, friction rollers journaled on the said levers and adapted to engage externally any one of the said internal gear wheels and a shaft to be driven, a pinion on the said shaft to be driven and in mesh at all times with the said gear wheel in the gear casing, means for shifting the latter, a spring interposed between each arm and the corresponding lever, and a counterweight on the said lever.

11. A variable speed transmission mechanism, comprising a series of step gear wheels rotating in unison, a series of internal gear wheels arranged concentrically with the said step gear wheels, a driving connection between each step gear wheel and its corresponding internal gear wheel, an annular gear casing surrounding the said internal gear wheels, a gearing mounted on the said gear casing and adapted to move in driving connection with any one of the said internal gear wheels on shifting the said casing, shifting means for shifting the said casing, and a pinion in mesh at all times with the said gearing mounted on the gear casing.

12. A variable speed transmission mechanism, comprising two series of step gear wheels rotating in unison, a series of internal gear wheels of like diameter and arranged concentrically with the said step gear wheels, pinions connecting one set of step gear wheels with corresponding internal gear wheels, a reversing gearing connecting the other set of step gear wheels with the remaining internal gear wheels, a gear casing surrounding the said internal gear wheels and mounted to slide longitudinally, means for shifting the said gear casing, a gear wheel mounted to turn in the said gear casing, a clutch member mounted to turn on the said gear casing gear wheel and adapted to engage exteriorly any one of the said internal gear wheels on shifting the said gear casing, and a pinion in mesh at all times with the said gear casing gear wheel.

HERBERT G. ALTVATER.